UNITED STATES PATENT OFFICE.

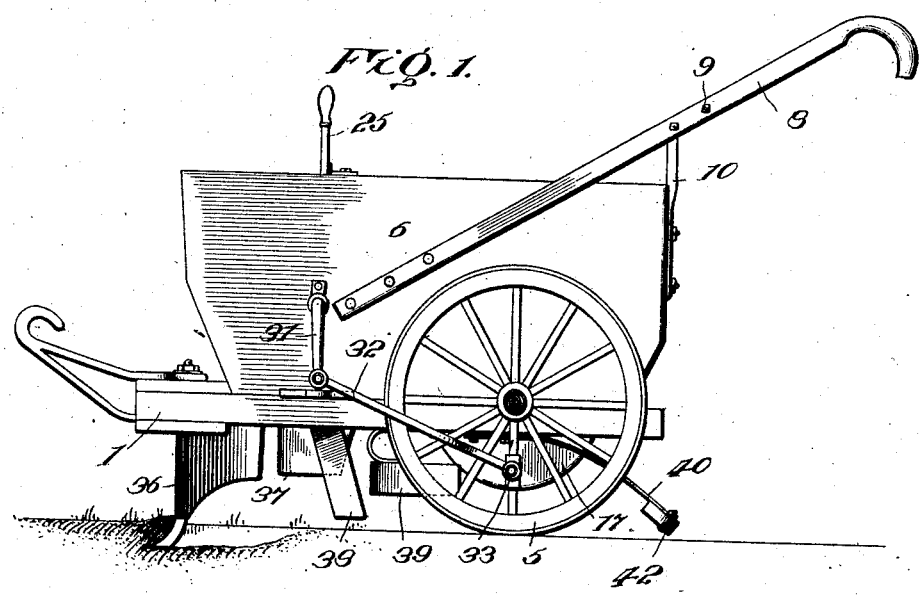

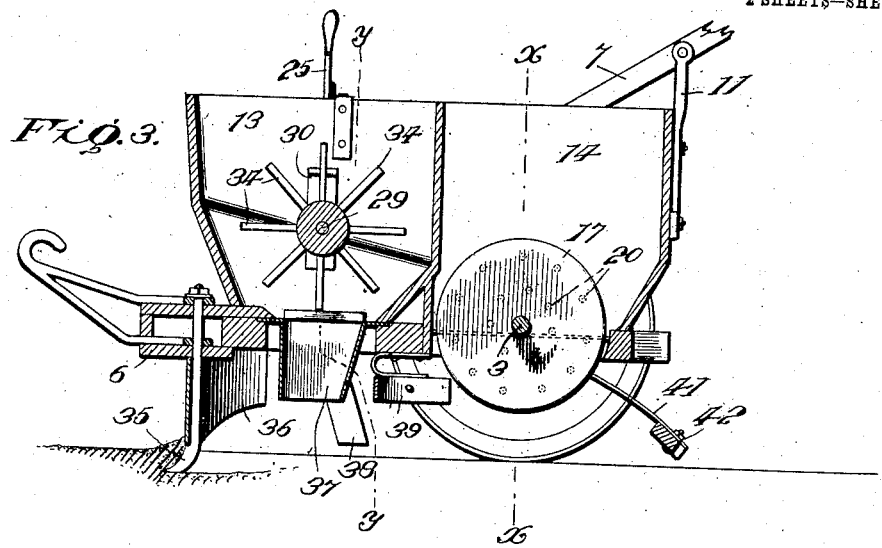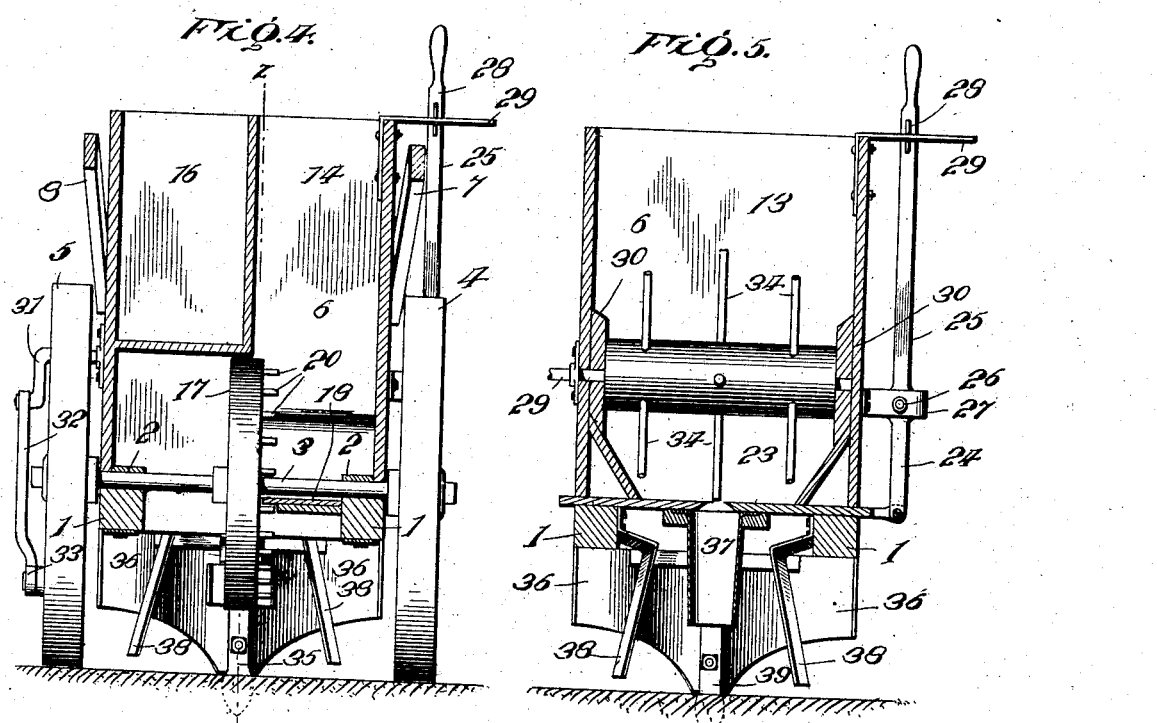

GEORGE TRAY PURVIS AND JOHN KING, OF WILSON, NORTH CAROLINA, ASSIGNORS TO A. J. JOYNER, OF WILSON, NORTH CAROLINA.

COMBINED PLANTER AND FERTILIZER-DISTRIBUTER.

No. 850,249.　　　　　Specification of Letters Patent.　　　Patented April 16, 1907.

Application filed January 4, 1906. Serial No. 294,583.

*To all whom it may concern:*

Be it known that we, GEORGE TRAY PURVIS and JOHN KING, citizens of the United States, residing at Wilson, in the county of Wilson and State of North Carolina, have invented certain new and useful Improvements in a Combined Planter and Fertilizer-Distributer, of which the following is a specification, reference being had therein to the accompanying drawings.

Our invention relates to improvements in a combined fertilizer-distributer and cotton-planter.

The object of our invention is to provide a planter of this character in which the fertilizer and cotton-seed can be accurately and evenly distributed no matter what the condition of the fertilizer or seed is and also absolutely preventing the gumming or clogging of the planter.

Another object of our invention is to provide means whereby the amount of fertilizer may be readily regulated and in which the same is readily and evenly distributed, whether the minimum or maximum amount is being fed.

A still further object of our invention is to provide a machine of this character in which the fertilizer is planted much deeper than the seed, thus preventing the absorption of the moisture of the seed by the fertilizer.

In the accompanying drawings, Figure 1 is a side elevation of our improved distributer and planter. Fig. 2 is a top plan view of Fig. 1. Fig. 3 is a longitudinal vertical sectional view. Fig. 4 is a transverse vertical sectional view taken on the line $x\,x$ of Fig. 3. Fig. 5 is a transverse vertical sectional view taken on the line $y\,y$ of Fig. 3.

Referring now to the drawings, 1 represents an elongated rectangular frame having mounted upon its upper face in journals 2 the transverse shaft or axle 3, which carries the supporting-wheels 4 and 5 for supporting the frame. The forward end of the frame is provided with the heavy transverse bar 6, to which is secured the clevis or any other desired draft means. Carried by the upper face of the said frame is a hopper 6, which, as shown, is of a size approximately that of the frame and extends upwardly to form a deep hopper for the purpose hereinafter described. Secured to the sides of the frame adjacent its forward end are the rearwardly and upwardly extending handles 7 and 8, which are connected together at their upper ends by the transverse bar 9, and said handles are also connected to the upper end of the hopper by means of the brace-rods 10 and 11. The hopper is provided intermediate its rear and forward ends with a vertical divisional plate 12, which forms a forward fertilizer-receptacle 13 and a rear seed containing and distributing receptacle 14. The rear receptacle or compartment is provided with a longitudinally-extending divisional plate 15, which also forms a shallow seed-containing box 16 to hold additional seed or a seed of different kind, if desired. The seedboxes 14 and 16, as shown, are directly above the shaft 3, and below the seedbox 16 and carried by the shaft is a disk 17, forming a part of one side of the seedbox 14, and is adapted to rotate with the shaft. The bottom 18 of the receptacle at the side adjacent the disk 17 is provided with cut-away portions forming four openings 19, which have unobstructed communication and engagement with the inner face of the disk 17. The openings serve as discharge-openings for allowing the seed to be evenly distributed as the planter is moved over the ground. The disk 17 has two circumferentially-arranged rows of inwardly-extending pins 20, which are so placed on the disk that upon the rotation of the shaft the pins pass upward through the openings on one side of the shaft and downward through the openings on the opposite side, so as to cause the proper feed of the seed through the openings. The said pins agitate the seed and carry with them as they pass downward through the two openings in the forward part of the lower plate a certain amount of seed.

The forward receptacle 13 for the fertilizer is provided with a hopper-bottom and is provided at its bottom with a horizontal slide 23, which extends outward through the side of the hopper and has pivotally connected thereto the lower end 24 of the lever 25. The said lever is pivoted at 26 between the arms 27, carried by the outside of the hopper. Thus it will be seen that the movement of the lever inward or outward causes the slides to move in or out, and thus make a larger or smaller opening through which the fertilizer passes and increasing or decreasing the feed thereof. The upper end of the lever is provided with a laterally-extending blade portion 28, which engages a rack 29, whereby the lever is held in its adjusted position. The said receptacle intermediate its top and bottom is provided with a transverse shaft 29, which is supported in journals 30, carried by the inner faces of the sides of the hopper. The said shaft has one end extending through the side of the hopper and is provided with a crank 31. Pivotally connected to said crank is a pitman 32, which is connected to a wrist-pin 33, carried by the wheel 5, and the rotation of said wheel causes the shaft 29 to oscillate in the hopper. The said shaft within the hopper is provided with radially-extending agitating-fingers 34, which are adapted to agitate the fertilizer and cause the same to be evenly fed through the openings in the bottom of the hopper, the amount fed being regulated by the slide, as heretofore described.

Secured in the lower face of the enlarged transverse bar 6 is a furrow-opener 35, which is provided with the two rearwardly-extending moldboards 36. Directly in rear of said furrow-opener is a chute 37, which communicates with the opening in the bottom of the receptacle and by means of which the fertilizer is conveyed to the bottom of the furrow. On each side of the tube and slightly in rear thereof are the covers 38, which are adapted to throw the dirt over upon the fertilizer, so that the seed will not be planted directly thereon. In rear of said covers and in a line with the chute 37 is a second furrow-opener 39, which digs a shallow furrow and which is also directly in advance of the disk 17. Thus the seed are spread within the furrow by the disk 17, heretofore described.

Carried by the extreme rear end of the frame are the downwardly-extending spring-arms 40 and 41, to the lower end of which is secured the cover 42, which is composed of a slightly-curved bar, forming the cover or scraper and by means of which the seed are covered over after being deposited.

Having thus described our invention, what we claim, and desire to secure by Letters Patent, is—

1. The combination with a horizontal frame, a hopper-frame, a hopper carried by the frame, and divided into two compartments, a shaft mounted upon the frame and extending through the rear compartment, supporting-wheels carried by the ends of the shaft, a vertical disk mounted upon the shaft and extending through a slot in the bottom of the compartment, and horizontal pins carreid by the inner side of the disk.

2. The combination with a horizontal elongated frame, an elongated hopper carried by the frame and divided into two compartments, a shaft mounted upon the upper face of the frame and extending through the rear compartment, supporting-wheels carried by the ends of the shaft, a vertical disk mounted upon the shaft within the compartment, and extending through the bottom thereof, and horizontally-arranged pins carried by the inner sides of the disk and passing through slots in the bottom of the compartment.

3. The combination with a horizontal frame, a hopper mounted thereon and divided into two compartments, a vertical plate dividing the rear compartment longitudinally of its length, a shaft carried by the upper face of the frame, and extending through the rear compartment, supporting-wheels carried by the outer ends of the shaft, a disk mounted upon the shaft within the rear compartment and having its inner face in a line with the vertical divisional plate, and laterally-extending pins carried by the inner face of the disk and adapted to travel through slots in the bottom of the compartment.

4. The combination with a horizontal frame, a hopper mounted thereon and divided into two compartments, a vertical plate dividing the rear compartment longitudinally of its length and having an opening in its lower edge, a shaft mounted upon the face of the frame and extending through the rear compartment and through the opening in the divisional plate, a disk mounted upon the shaft and having one edge flush with the vertical divisional plate, laterally-extending pins carried by the inner face of the disk and a bottom carried by the rear compartment and having openings through which the lateral pins are adapted to pass.

5. The combination with a horizontal frame, a hopper mounted thereon and divided into two compartments, a vertical plate dividing the rear compartment longitudinally of its length, a shaft carried by the upper face of the frame and extending through the rear compartments, supporting-wheels carried by the outer ends of the shaft, a disk mounted upon the shaft within the rear compartment and having its inner face in a line with the vertical divisional plate, laterally-extending pins carried by the inner face of the disk and adapted to travel through slots in the bottom compartment, a furrow-opener in advance of the discharge-opening of the front compartment, covers carried by the frame in rear of the discharge-opening, a second furrow-opener in rear of the covers and in advance of the discharge-opening of the rear compartment and having its lower end in a plane above the front furrow-opener, and a cover carried by the frame in rear of the discharge-opening of the rear compartment.

6. The combination with a frame, a hopper carried thereby, and divided into a front and rear compartment having discharge-openings in their bottoms, a slide for controlling the size of the discharge of the forward compartment, a lever intermediately pivoted to the side of the hopper and having its lower end pivotally connected to the slide, a rack-bar for holding the upper end of the lever in its adjusted position, a shaft mounted upon the frame and extending through the rear compartments, a feeding mechanism carried directly by the shaft and draft-wheels carried by the outer ends of the shaft.

In testimony whereof we affix our signatures in presence of two witnesses.

GEORGE TRAY PURVIS.
JOHN KING.

Witnesses:
O. P. DICKINSON,
W. R. WOOD.